(12) United States Patent
Fassnacht

(10) Patent No.: US 10,160,411 B2
(45) Date of Patent: Dec. 25, 2018

(54) VEHICLE ELECTRICAL SYSTEMS

(71) Applicant: Robert Bosch GmbH, Stuttgart (DE)

(72) Inventor: Jochen Fassnacht, Calw (DE)

(73) Assignee: ROBERT BOSCH GMBH, Stuttgart (DE)

( * ) Notice: Subject to any disclaimer, the term of this patent is extended or adjusted under 35 U.S.C. 154(b) by 21 days.

(21) Appl. No.: 15/513,254

(22) PCT Filed: Jul. 31, 2015

(86) PCT No.: PCT/EP2015/067614
§ 371 (c)(1),
(2) Date: Mar. 22, 2017

(87) PCT Pub. No.: WO2016/045836
PCT Pub. Date: Mar. 31, 2016

(65) Prior Publication Data
US 2017/0297517 A1 Oct. 19, 2017

(30) Foreign Application Priority Data
Sep. 23, 2014 (DE) ................. 10 2014 219 133

(51) Int. Cl.
*B60R 16/03* (2006.01)
*B60R 16/023* (2006.01)
*B60R 21/017* (2006.01)
*H02J 7/00* (2006.01)

(52) U.S. Cl.
CPC .......... *B60R 16/03* (2013.01); *B60R 16/0231* (2013.01); *B60R 21/017* (2013.01); *H02J 7/00* (2013.01)

(58) Field of Classification Search
CPC ..................................................... B60R 16/03
See application file for complete search history.

(56) References Cited

U.S. PATENT DOCUMENTS

| | | | | |
|---|---|---|---|---|
| 8,324,754 B2* | 12/2012 | Broesse | ................. | B60R 16/03 |
| | | | | 307/10.1 |
| 8,749,193 B1* | 6/2014 | Sullivan | .................... | H02J 1/08 |
| | | | | 307/10.7 |
| 9,581,123 B2* | 2/2017 | Betscher | ............... | F02N 11/087 |
| 9,644,594 B2* | 5/2017 | Betscher | ................ | B60R 16/03 |

(Continued)

FOREIGN PATENT DOCUMENTS

| | | |
|---|---|---|
| DE | 10020304 A1 | 10/2001 |
| DE | 10251589 A1 | 5/2004 |
| DE | 10324250 A1 | 12/2004 |

(Continued)

OTHER PUBLICATIONS

International Search Report dated Oct. 12, 2015 of the corresponding International Application PCT/EP2015/067614 filed Jul. 31, 2015.

*Primary Examiner* — Daniel Kessie
(74) *Attorney, Agent, or Firm* — Norton Rose Fulbright US LLP; Gerard Messina

(57) ABSTRACT

In a vehicle electrical system, a method supplies a number of consumers of the system, which consumers are classified with different safety classifications, the differently classified consumers being supplied power from either one or more of a plurality of electrical subsystems according to their classifications or lack of classification.

10 Claims, 2 Drawing Sheets

(56) References Cited

U.S. PATENT DOCUMENTS

2007/0170781 A1\* 7/2007 Jabaji ..................... B60L 1/00
                                                               307/10.1

FOREIGN PATENT DOCUMENTS

| | | |
|---|---|---|
| DE | 102005004330 A1 | 8/2006 |
| DE | 102006010713 A1 | 9/2007 |
| JP | 2002200948 A | 7/2002 |
| JP | 2004338577 A | 12/2004 |
| JP | 2005086968 A | 3/2005 |
| JP | 2005533702 A | 11/2005 |
| JP | 2011207384 A | 10/2011 |
| WO | 2004/070911 A1 | 8/2004 |
| WO | 2006/023426 A2 | 3/2006 |

\* cited by examiner

VEHICLE ELECTRICAL SYSTEMS

CROSS-REFERENCE TO RELATED APPLICATIONS

The present application is the national stage of International Pat. App. No. PCT/EP2015/067614 filed Jul. 31, 2015, and claims priority under 35 U.S.C. § 119 to DE 10 2014 219 133.5, filed in the Federal Republic of Germany on Sep. 23, 2014.

FIELD OF THE INVENTION

The present invention relates to a vehicle electrical system, in particular to a vehicle electrical system for a motor vehicle having a plurality of consumers, and to a method for supplying consumers in a vehicle electrical system of a motor vehicle.

BACKGROUND

Vehicle electrical systems in motor vehicles have a multitude of electrical consumers that are supplied with electrical energy from an energy supply, e.g., as a battery or a generator. In addition, vehicle electrical systems also have electromechanical or electronic components such as switches and voltage converters.

The electrical energy in the motor vehicle should be available such that the motor vehicle is able to be started at any time and a sufficient current supply is ensured during the operation so that, as a minimum, safety-related devices such as the brakes, the steering system and also the lights are supplied in a reliable and uninterrupted manner. In the off state, electrical consumers should still be operable for an adequate period of time without making a subsequent start impossible. It should be noted that an interruption in the supply of the consumers may occur in case of a malfunction in the voltage supply or a short-circuit in the vehicle electrical system, which in turn results in a failure of functionalities of the motor vehicle.

The introduction of novel electronic and mechatronic systems in the motor vehicle, such as electrical steering systems or novel assistance systems, e.g., the brake assistant or an adaptive cruise control, which lower the energy consumption of the vehicle and markedly enhance the safety and comfort for the driver, is currently on the rise. In the future, further systems that allow for autonomous or partially autonomous driving are in the planning stage or are currently being developed. If such systems are installed in a vehicle, they, too, must operate reliably and meet the demands of functional safety. Specifically to be avoided in this context are what are termed common cause errors or single errors, which then lead to an abrupt malfunction of the entire system or subsystem.

Thus, the use of such new systems also places higher demands on the safety and availability of the vehicle electrical system inasmuch as these systems are, for the most part, supplied from the standard 12V vehicle electrical system of the vehicle. Vehicle electrical systems with a higher voltage are also used, especially for commercial vehicles. Under no circumstances should a failure of the vehicle electrical system on the basis of a single error lead to a failure of a safety-related system that is indispensable for the safe functioning of the vehicle and which draws its energy from the 12V vehicle electrical system.

A single fault, such as a short circuit in the vehicle electrical system or the failure of a battery or the generator, should not lead to the loss of the steering or braking ability of the vehicle. A defect of this type may also not lead to the abrupt failure of a system for the autonomous or partially autonomous control of the vehicle, for example. A driver of an automobile who relies on the system and possibly just happens to be inattentive might then perhaps react too late or incorrectly in the event of a sudden failure, which could lead to a dangerous situation.

The currently most frequently installed vehicle electrical system with a generator and a 12V battery is largely sufficient for the presently installed electrical systems. Novel safety-related systems, whose function is indispensable for the safe operation of the vehicle, require novel vehicle-electrical system topologies, which ensure the energy supply for these safety-related consumers in a reliable manner.

As already mentioned, safety-relevant consumers that carry out important functions in the motor vehicle and must not fail under any circumstances are provided in modern vehicle electrical systems to an increasing extent. In order to ensure this, it is known to connect safety-related consumers to one or multiple vehicle electrical subsystems, each vehicle electrical subsystem having its own energy supply that may include a battery and/or a generator, for instance. In the event of a failure of the energy supply of a vehicle electrical subsystem, safety-related consumers are able to be supplied from other vehicle electrical subsystems and can thereby maintain their operation.

The printed publication DE 10 2005 004 330 A1 describes a vehicle electrical system for safety-related consumers, which includes at least two vehicle electrical subsystems, in which a safety-related consumer is to be supplied with a supply voltage via two different supply paths, the supply paths being able to be decoupled from each other with the aid of decoupling means. In addition, the safety-related consumer is able to be connected to at least two energy accumulators by way of at least four supply paths.

Known from the printed publication DE 102 51 589 A1 is a vehicle electrical system having at least two vehicle electrical subsystems in which a respective supply voltage is available. Provided in the vehicle electrical system is a safety-related consumer, which is connected to one of the vehicle electrical subsystems. A supply voltage is able to be applied to this consumer via two different supply paths, and the supply paths are able to be decoupled from each other with the aid of decoupling means, such a switches.

SUMMARY

Against this background, example embodiments of the present invention provide a vehicle electrical system and a method.

According to an example embodiment of the present invention, the vehicle electrical system is designed to supply electrical energy from one of at least two electrical subsystems to consumers having what is termed an average safety relevance. For this purpose, the consumer is connected to the vehicle electrical subsystems by way of switches, for instance, and can be connected between the two vehicle electrical subsystems in a symmetrical manner. In addition, consumers without safety relevance are provided, which are likewise supplied with energy. It is of course possible to provide further consumers with a high safety relevance.

Thus, topologies of vehicle electrical systems are introduced that ensure a reliable supply of safety-related consumers and supply the "usual" consumers in an efficient manner. This is achieved with little effort. The main focus is on topologies that supply consumers of average safety relevance and no safety relevance.

A vehicle electrical subsystem is characterized by its own energy supply, which is typically independent of the other vehicle electrical subsystems. For example, a battery and/or a generator can serve as energy supply. In addition, a vehicle electrical subsystem can be equipped with an energy accumulator.

Consumers in the vehicle electrical system are allocated to devices or components of the vehicle such as electronic brake systems, light systems and electronic steering systems. Depending on the assigned component, the respective consumer is assigned a safety classification.

For example, each vehicle electrical subsystem is supplied with energy via a base vehicle electrical system from a generator situated therein; the vehicle electrical subsystem is separated from the base vehicle electrical system by a voltage converter or a switch and can have a separate energy accumulator so that consumers in this vehicle electrical subsystem are able to be supplied at a high voltage quality and with great reliability. In addition to the consumers, it is also possible to provide monitoring devices in the vehicle electrical subsystems.

Additional advantages and further developments of the present invention result from the description and the attached drawings.

It is understood that the aforementioned features and the features still to be discussed in the following text can be used not only in the respective combination indicated, but also in other combinations or can be used on their own without departing from the scope of the present invention.

DETAILED DESCRIPTION

Example embodiments of the present invention are schematically shown in the figures and are described in detail in the following text with reference to those figures.

Consumers are basically able to be subdivided into multiple categories in accordance with their safety relevance. The topologies introduced in the following text are based on consumers of the following three categories.

Consumer R1: high safety relevance and redundant supply, where the consumer is assigned a high safety classification;

Consumer R2: average safety relevance, where the consumer is assigned an average safety classification; and Consumer R3: no safety relevance, where the consumer is assigned no safety classification.

Figure 1:
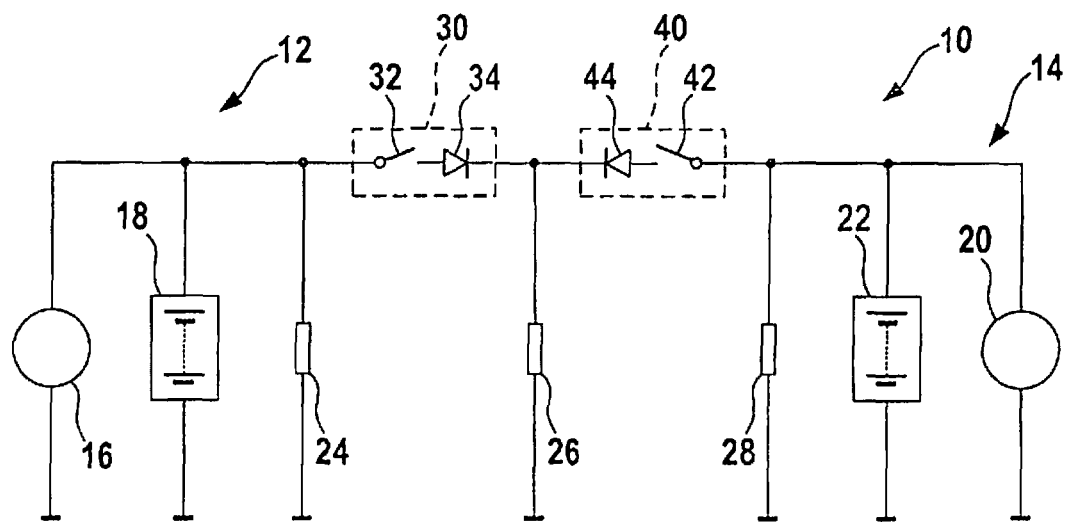
FIG. 1 is a diagram of a circuit system according to an example embodiment of the present invention.

FIG. 1 shows a vehicle electrical system 10 according to an example embodiment, in which a consumer having an average safety relevance is supplied from two vehicle electrical subsystems. The illustration shows a first vehicle electrical subsystem 12 and a second vehicle electrical subsystem 14. A first generator 16 and a first battery 18 are allocated to first vehicle electrical subsystem 12. A second generator 20 and a second battery 22 are allocated to second vehicle electrical subsystem 14. In addition, the illustration shows a consumer R3a 24, a consumer R2 26, and a consumer R3b 28. Moreover, a first switch unit 30 having a first switch 32 and a first diode 34 as well as a second switch unit 40 having a second switch 42 and a second diode 44 are depicted.

Hereinafter, consumers R3a 24 and R3b 28 are independent consumers of safety category 3, or in other words, they are consumers without safety relevance. This means that no redundant supply of a consumer is involved as would be the case with consumers of category 1, i.e., consumers of high safety relevance. Consumer R2 26 is a consumer of safety category 2 and thus a consumer of average safety relevance. It is disposed symmetrically with respect to the two vehicle electrical subsystems 12, 14.

The consumers are integrated into vehicle electrical system 10 in accordance with this classification. As described at the outset, in the vehicle electrical system topologies introduced herein, consumers having at most an average safety relevance are supplied predominantly or even exclusively. Vehicle electrical system 10 of FIG. 1 is basically made up of the two vehicle electrical subsystems 12, 14 to the left and right; each has a generator 16 or 20 and battery 18 or 22, which supply a consumer of average safety relevance, i.e., consumer R2 26, by way of intelligent switch units 30, 40. Intelligent switch units 30, 40 have a diode function, which means that they permit a current flow only from one of the vehicle electrical subsystems 12 or 14 to consumer R2 26. In the event that a source, e.g., a generator 16 or 20, of a vehicle electrical subsystem 12 or 14 causes an overvoltage, respective intelligent switch unit 20 or 40 carries out a separation as well. Generators 16, 20 may exist as two separate generators 16, 20 or as two generators 16, 20 on a shaft and possibly inside a housing.

The advantage of the topology in FIG. 1 is that if either the right or the left vehicle electrical subsystem 12 or 14 fails completely, e.g., also with a short circuit, the supply of consumer R2 26 is still ensured on a permanent basis. In theory it is also possible to supply a plurality of consumers of category 2 in parallel. However, it must then be ensured that no such consumer causes a short circuit or an overvoltage that leads to the failure of the other consumers.

Figure 2:
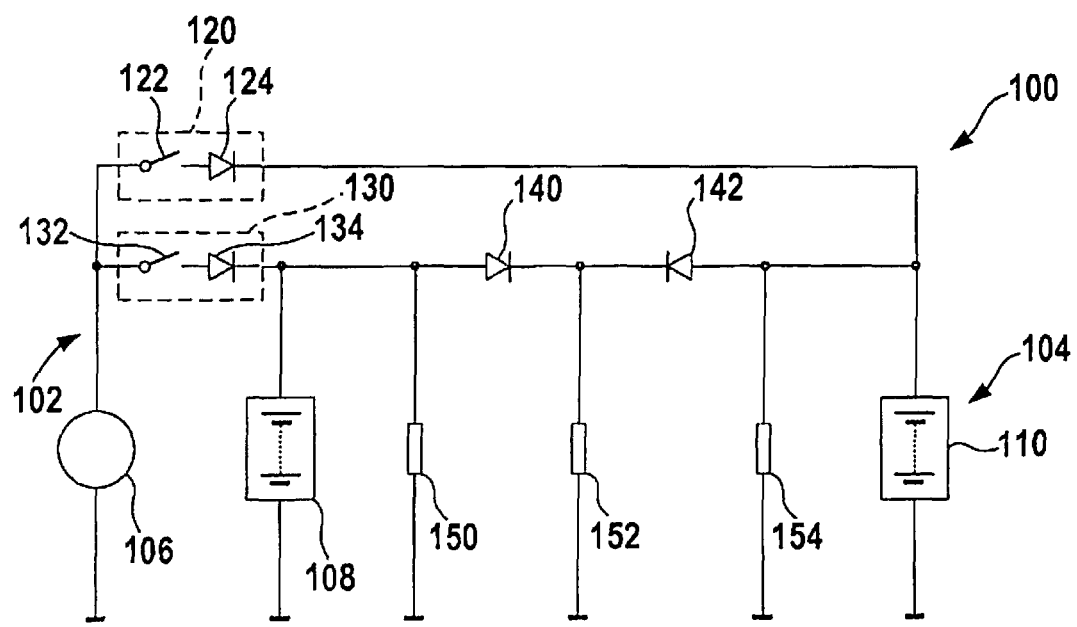
FIG. 2 is a diagram of a circuit system according to another example embodiment of the present invention.

If no permanent supply independent of a random single fault is required, then an example topology according to FIG. 2 can be selected, including a vehicle electrical system having two vehicle electrical subsystems, including a battery in each case, which are supplied from a generator. FIG. 2 shows a vehicle electrical system, which is denoted by reference numeral 100 as a whole. It includes a first vehicle electrical subsystem 102 and a second vehicle electrical subsystem 104. Both vehicle electrical subsystems 102, 104 are allocated a generator 106. It supplies a first battery 108 in first vehicle electrical subsystem 102 and a second battery 110 in second vehicle electrical subsystem 104.

The illustration furthermore shows a first switch unit S1a 120 having a first switch 122 and a first diode 124, a second switch unit S1b 130 having a second switch 132 and a second diode 134, a third diode D2a 140, a fourth diode 142, a consumer R3a 150, a consumer R2 152, as well as a consumer R3b 154.

In this specific example embodiment, a generator is dispensed with and the two vehicle electrical subsystems 102, 104, each having a respective battery 108 and 110, are supplied via a single generator, i.e., generator 106, and if necessary, are decoupled from it via intelligent switch units S1a 120, S1b 130. If generator 106 causes a short circuit or an overvoltage, then both vehicle electrical systems 102, 104 are separated from it and may continue to operate until batteries 108, 110 are drained. Consumer R2 152, which represents a consumer of average safety relevance, can thus still be supplied until both vehicle electrical subsystems 102, 104 have failed.

Instead of diodes D2a 140 and D2b 142, it is also possible to use intelligent switches that have a diode function. If generator 106 fails in such a case, then the driver should be warned that his or her vehicle or safety-related systems might fail in the foreseeable future. In the event of a battery short circuit, affected battery 108 or 110 is separated from consumer R2 152 via corresponding diode 140 or 142, and generator 106 is likewise separated from battery 108 or 110 via intelligent switch unit 120 or 130. Consumer R2 152, having an average safety relevance, can continue to be supplied via other battery 108 or 110. During the operation, consumer R3a 150 without safety relevance is supplied from first vehicle electrical subsystem 102, and consumer R3b 154 without safety relevance is supplied from second vehicle electrical subsystem 104.

Figure 3:
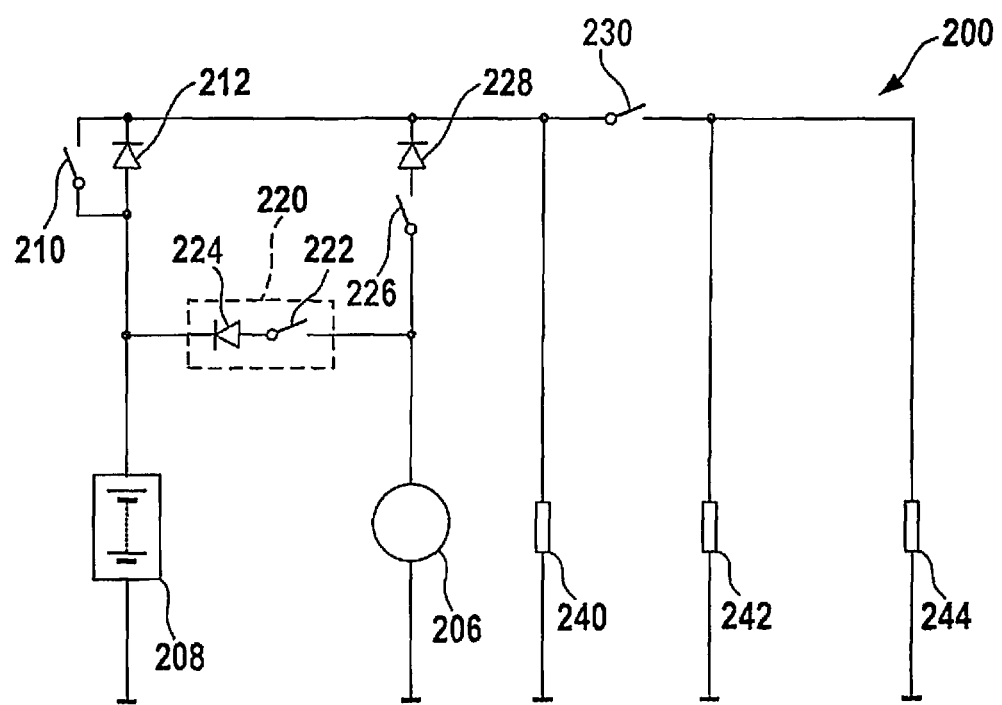
FIG. 3 is a diagram of a circuit system according to another example embodiment of the present invention.

To simplify matters, it is also possible to omit the second battery. An example of such a topology including a generator and a battery is illustrate in FIG. 3. FIG. 3 shows a vehicle electrical system 200.

In this case, a vehicle electrical subsystem made up of generator and consumer could be indicated in the event of a failure of the battery, and a vehicle electrical subsystem made up of battery and consumer could be indicated in the event of a failure of the generator.

The illustration shows a generator 206, a battery 208, a first switch 210 parallel to a first diode D1 212, a switch unit 220 having a switch S1 222 and a diode 224, a switch S2 226 in series with a second diode 228, a switch S3 230 as well as a consumer R2 240 of average safety relevance, a consumer R3a 242 with no safety relevance, and a consumer R3b 244 with no safety relevance.

In this specific example embodiment, consumer R2 240 having an average safety relevance may be supplied either by way of generator 206 or battery 208 in the event that the other component fails. Generator 206 may fail both with a short circuit and an overvoltage. Vehicle electrical system 200 is effectively shielded from such a failure via switch S1 222 or switch S2 226. A battery, in this case battery 206, exhibits no overvoltage. As a result, only the short circuit of battery 208 is separated from vehicle electrical system 200 via diode D1 212.

However, in this case it should be taken into account that with a non-available battery 208, its buffer effect is lost as well. Consumers that draw steep and high power pulses from vehicle electrical system 200 are therefore unable to be supplied or can be supplied only with derating, i.e., choking. Provided battery 208 exhibits no short circuit, and parallel first switch 210 enables charging also via energy currents from vehicle electrical system 200, e.g., during braking of electrical drives.

If a consumer without safety relevance, in this case consumer R3a 242 or consumer R3b 244, causes a short circuit or an overvoltage, such an event is kept away from consumer R2 240 by switch S3 230 opening. Switch unit 220 between battery 208 and generator 206 prevents that a short circuit of generator 206 or battery 208 also short-circuits the respective other component, and enables charging of battery 208 by generator 206.

In the illustrated specific example embodiments of FIGS. 1 through 3, switches are therefore provided by which back-and-forth switching between the two vehicle electrical subsystems is possible for consumer R2 with an the average safety classification. In addition, switches are provided that make it possible to separate vehicle electrical subsystems, energy supplies, i.e., battery and/or generator, and/or consumers from the vehicle electrical system.

What is claimed is:

1. An electrical system comprising:
    a generator;
    a plurality of electrical subsystems that each includes its own energy supply; and
    a plurality of consumers, wherein:
        at least one of the consumers, which is classified with an average safety classification, is suppliable with power from either one of at least two of the electrical subsystems; and
        at least one of the consumers, which is not classified with a safety classification, is suppliable with power from only one of the electrical subsystems, and
        the at least one consumer having an average safety classification is situated symmetrically between two of the vehicle electrical subsystems;
    wherein each of the plurality of electrical subsystems includes its own energy supply, wherein each of the energy supplies includes a battery, wherein the generator is coupleable to one of the energy supplies via an intelligent switch, which includes a switch function and a diode function, and wherein the generator is coupleable to another of the energy supplies via another intelligent switch, which includes another switch function and another diode function.

2. The electrical system of claim 1, further comprising:
    at least one switch via which the at least one consumer classified with the average safety classification is supplied from the at least two of the electrical subsystems.

3. The electrical system of claim 1, further comprising:
    at least one switch by which at least one of the electrical subsystems is separable from the electrical system.

4. The electrical system of claim 1, further comprising:
    at least one switch by which one of the consumers is separable from the electrical system.

5. The electrical system of claim 1, wherein the at least one consumer classified with the average safety classification is situated symmetrically between two of the electrical subsystems.

6. The electrical system of claim 1, wherein the electrical system is part of a motor vehicle.

7. The electrical system of claim 1, wherein the electrical system is part of a mobile work machine.

8. A method for supplying a consumer classified with an average safety classification and a consumer not classified with a safety classification, the method comprising:
    supplying power to the consumer classified with the average safety classification from either one of at least two of a plurality of vehicle electrical subsystems; and
    supplying power to the consumer that is not classified with a safety classification from only one of the plurality of vehicle electrical subsystems;
    wherein the at least one consumer having an average safety classification is situated symmetrically between two of the vehicle electrical subsystems, and
    wherein each of the plurality of electrical subsystems includes its own energy supply, wherein each of the energy supplies includes a battery, wherein the generator is coupleable to one of the energy supplies via an intelligent switch, which includes a switch function and a diode function, and wherein the generator is coupleable to another of the energy supplies via another intelligent switch, which includes another switch function and another diode function.

9. The method of claim 8, further comprising:
separating at least one of the consumers from at least one of the electrical subsystems by operating a switch.

10. The method of claim 8, further comprising:
separating at least one of the electrical subsystems from a vehicle electrical system by operating at least one switch.

\* \* \* \* \*